United States Patent
Farooq et al.

(10) Patent No.: US 9,988,018 B2
(45) Date of Patent: Jun. 5, 2018

(54) WINDOW WIPER SYSTEM FOR PROVIDING ENHANCED PERFORMANCE IN WINTER WEATHER CONDITIONS

(71) Applicant: FORD GLOBAL TECHNOLOGIES, LLC, Dearborn, MI (US)

(72) Inventors: Iskander Farooq, Novi, MI (US); Mohammed Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 794 days.

(21) Appl. No.: 14/338,616

(22) Filed: Jul. 23, 2014

(65) Prior Publication Data
US 2016/0023637 A1    Jan. 28, 2016

(51) Int. Cl.
*B60S 1/34* (2006.01)
*B60S 1/04* (2006.01)

(52) U.S. Cl.
CPC .......... *B60S 1/0455* (2013.01); *B60S 1/3413* (2013.01); *B60S 1/3475* (2013.01)

(58) Field of Classification Search
CPC .... B60S 1/3463; B60S 1/3475; B60S 1/3413; B60S 1/3411; B60S 1/347; B60S 1/3422; B60S 1/0455
USPC .......... 15/250.19, 250.202, 250.203, 250.16, 15/250.351
See application file for complete search history.

(56) References Cited

U.S. PATENT DOCUMENTS

| | | | | |
|---|---|---|---|---|
| 1,911,155 A | * | 5/1933 | Hueber | B60S 1/3411 15/250.19 |
| 2,784,438 A | * | 3/1957 | Petersen | B60S 1/08 15/250.19 |
| 4,864,678 A | * | 9/1989 | Stevens | B60S 1/32 15/250.34 |
| 5,469,595 A | | 11/1995 | Dara | |
| 5,487,204 A | * | 1/1996 | Nelson | B60S 1/34 15/250.19 |

(Continued)

FOREIGN PATENT DOCUMENTS

| | | | |
|---|---|---|---|
| EP | 1462328 A2 | * | 9/2004 |
| JP | 4-85150 | * | 3/1992 |
| JP | 2008-44463 | * | 2/2008 |

OTHER PUBLICATIONS

Machine translation of description portion of EP publication 1462328, dated Sep. 2004.*

*Primary Examiner* — Gary Graham
(74) *Attorney, Agent, or Firm* — Jason Rogers; King & Schickli, PLLC

(57) ABSTRACT

A window wiper system is provided for enhanced performance in winter weather conditions. The wiper system includes a wiper assembly having a wiper base, a wiper arm pivotally connected to the wiper base and wiper blade carried on the wiper arm. An actuator carried on the wiper assembly selectively displaces the wiper arm between an operating position wherein the wiper blade engages and sweeps the vehicle window and a raised position wherein the wiper blade is lifted from the vehicle window. When the wiper blade is displaced from the raised position to the operating position it impacts the window with sufficient force to remove any accumulated ice from the wiper assembly without damaging the assembly or the window.

6 Claims, 8 Drawing Sheets

(56) References Cited

U.S. PATENT DOCUMENTS

| | | | |
|---|---|---|---|
| 5,551,116 A | 9/1996 | DeKelaita | |
| 5,867,858 A | 2/1999 | Kelly | |
| 6,381,799 B1* | 5/2002 | Leutsch | B60S 1/04 15/250.19 |
| 6,721,989 B1 | 4/2004 | Barlow | |
| 7,549,189 B1 | 6/2009 | Mayer | |
| 2004/0068821 A1* | 4/2004 | Genick, II | B60S 1/3413 15/250.19 |

* cited by examiner

WINDOW WIPER SYSTEM FOR PROVIDING ENHANCED PERFORMANCE IN WINTER WEATHER CONDITIONS

TECHNICAL FIELD

This document relates generally to the vehicle equipment field and, more particularly, to a window wiper system for a vehicle that provides enhanced performance in winter weather conditions.

BACKGROUND

Vehicle operators often encounter snow and/or ice that accumulates on the window wiper assembly either while the vehicle is parked outside in the winter weather conditions and/or at certain times during vehicle operation during periods of precipitation in below freezing temperatures. Unfortunately, the accumulated ice and snow often causes the wiper blades to lose their effectiveness in clearing the window which may result in alarmingly poor visibility. The driver then has to pull over, exit the vehicle and dislodge the buildup of ice and snow from the wiper blade assembly. This is typically done by slamming the wiper blades against the windshield or window glass, by violently shaking the wiper blade assembly or in some other way. Unfortunately, the conditions that initially led to the accumulation of ice and snow on the wiper assembly may remain in effect for a substantial period of time, forcing the driver to repeat this procedure a number of times before reaching his destination. Clearly this represents a substantial safety hazard to the driver both during the operation of the vehicle and when he exits the vehicle along a busy and slick road to clean the wiper assembly. It also represents an annoying and distressing inconvenience that may even physically challenge elderly drivers who must leave the vehicle in subfreezing temperatures in order to remove the ice and snow from the windshield wiper assembly.

This document relates to a new and improved window wiper system providing for enhanced performance in winter weather conditions. This system allows one to remotely remove accumulated ice and snow from the windshield wiper assembly without leaving the interior the vehicle.

SUMMARY

In accordance with the purposes and benefits described herein, a windshield wiper system is provided. That windshield wiper system provides enhanced performance in winter weather conditions advantageously allowing a vehicle operator to: (1) position the wiper assembly above the window so that ice and snow are less likely to accumulate on it when the vehicle is parked outside in a winter storm and (2) remove accumulated ice and snow from the wiper assembly without leaving the safety and comfort of the interior of the vehicle. The window wiper system comprises a wiper assembly including a wiper base, a wiper arm pivotally connected to the wiper base and a wiper blade carried on the wiper arm. The wiper arm is selectively displaceable between an operating position wherein the wiper blade engages and sweeps a vehicle window and a raised position wherein the wiper blade is lifted from the vehicle window. An actuator is carried on the wiper assembly. The actuator displaces and holds the wiper arm in the raised position either during operation of the wiper assembly or while the vehicle is at rest. A control switch is provided inside the vehicle for activating the actuator.

In one possible embodiment the actuator further includes a cable and a leaf spring. The cable extends from the actuator to the leaf spring carried on the wiper arm. That leaf spring has a first end connected to the cable and second end connected to the wiper arm. That leaf spring provides a force for biasing the wiper arm toward the operating position. When the cable is retracted, the wiper arm is displaced into the raised position and the wiper blade is lifted from the vehicle window. This simultaneously loads the leaf spring and increases the biasing force with which the wiper blade is subsequently brought into engagement with the vehicle window thereby producing an impact to remove accumulated ice and snow from the wiper assembly.

The device further includes a series of cable supports on the wiper base and the wiper arm for guiding the cable across the wiper assembly to a connection point with the leaf spring. The actuator is secured to the wiper base. In one embodiment the actuator is a rotary actuator. In another embodiment, it is a solenoid.

In another possible embodiment, the actuator is a rotary actuator and a cooperating control bar carried on the wiper base. The actuator has a common pivot axis with the wiper arm. The control bar engages and nests in the wiper arm displacing the wiper arm between the operating and raised positions.

In accordance with an additional aspect, a method is provided for limiting and cleaning ice and snow accumulation on a vehicle window wiper assembly. That method comprises the steps of: (a) manipulating a switch provided in an interior of the vehicle to displace the wiper assembly from an operating position to a raised position wherein a wiper blade of the wiper assembly is lifted from the vehicle window, (b) holding the wiper assembly in the raised position while the vehicle is parked at a particular location to prevent the wiper assembly from freezing to the vehicle window, and (c) manipulating the switch provided in the interior of the vehicle to suddenly displace the wiper assembly from the raised position to the operating position whereby the wiper blade impacts the vehicle window with sufficient force to remove accumulated ice and snow from the wiper assembly.

Still further the method includes displacing the wiper assembly by means of a rotary actuator carried on the wiper assembly. In another embodiment the method includes displacing the wiper simply by means of a cable and cooperating leaf spring carried on the wiper assembly. Further the method includes providing a biasing force to return the wiper assembly from the raised position to the operating position and remove accumulated ice and snow from the wiper assembly. This biasing force is provided with the leaf spring.

In the following description, there is shown and described several preferred embodiments of the windshield wiper system. As it should be realized, the windshield wiper system is capable of other, different embodiments and its several details are capable of modification in various, obvious aspects all without departing from the windshield wiper system as set forth and described in the following claims. Accordingly, the drawings and descriptions should be regarded as illustrative in nature and not as restrictive.

BRIEF DESCRIPTION OF THE DRAWINGS

The accompanying drawings incorporated herein and forming a part of the specification, illustrate several aspects of the windshield wiper system and together with the description serve to explain certain principles thereof. In the drawings.

Reference will now be made in detail to the present preferred embodiment of the windshield wiper system, examples of which are illustrated in the accompanying drawings.

DETAILED DESCRIPTION

Figure 1:
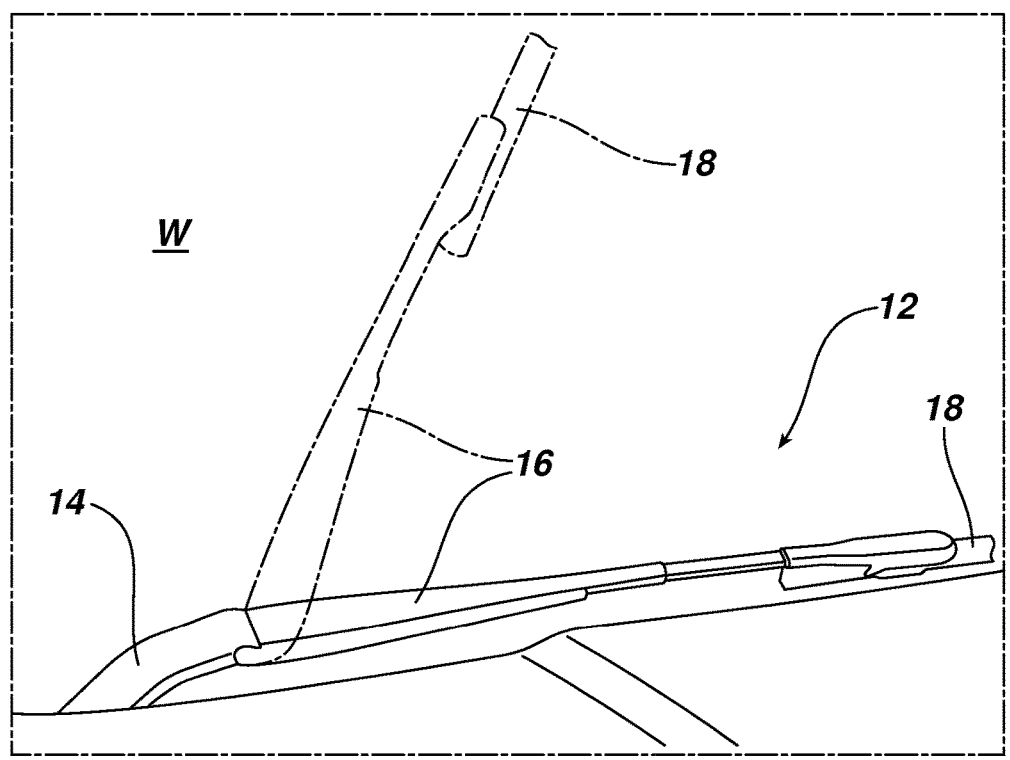
FIG. 1 is a perspective view with the windshield wiper assembly shown in full-line in a normal operating position, parked on the windshield by the hood just as assumed when turned off and in phantom line in a raised position where the assembly may optionally be placed when the vehicle is parked in order to minimize the accumulation of ice and snow on the wiper assembly.
Figure 2:
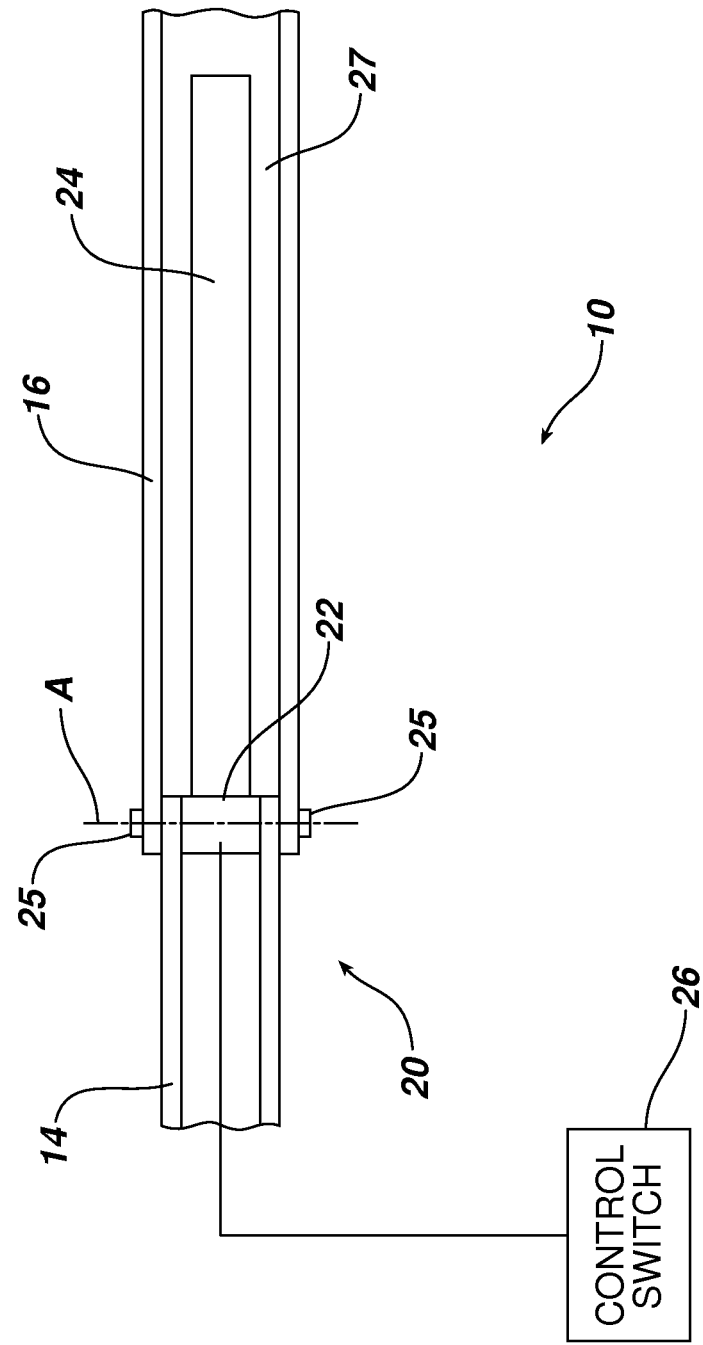
FIG. 2 is a detailed schematical bottom plan view of the rotary actuator and cooperating control bar that are carried on the wiper base and that selectively raise the wiper arm and then return the wiper blade to the windshield.

Reference is now made to FIGS. 1 and 2 schematically illustrating the windshield wiper system 10 adapted to provide enhanced performance in winter weather conditions. While the illustrated embodiment is a wiper system 10 for a windshield, it should be appreciated that the wiper system may just as easily be utilized for maintaining other windows of a vehicle clear of precipitation including, for example, the rear window of a hatchback vehicle or a liftgate of an SUV. Further, for simplicity, only one wiper arm 16 and blade 18 are illustrated in the drawing figures. It should be appreciated, however, that the wiper assembly 12 may include two cooperating wiper arms and blades as commonly used to sweep the windshields of motor vehicles.

The wiper system 10 may be generally described as including a wiper assembly 12 including a wiper base 14, a wiper arm 16, pivotally connected to the wiper base and a wiper blade 18 carried on the wiper arm. The wiper arm 16 is selectively displaceable between an operating position wherein the wiper blade 18 engages and sweeps a vehicle window W (note full-line position in FIG. 1) and a raised position wherein the wiper blade is lifted from the vehicle window (note phantom line position in FIG. 1). An actuator, generally designated by reference numeral 20, is carried on the wiper assembly 12. This actuator 20, functions to displace and, if desired, hold the wiper arm 16 in the raised position either during operation of the wiper assembly 12 or, if desired while the vehicle is at rest.

In the embodiment illustrated in FIG. 2, the actuator 20 comprises a rotary actuator 22 and a cooperating control bar 24. As illustrated the rotary actuator 22 is mounted on the wiper base 14. The rotary actuator 22 and control bar 24 have a common pivot axis with the wiper arm 16 (note axis A extending through pivot pins 25). Further, the control bar 24 engages and nests in a channel 27 on the underside of the wiper arm 16 allowing the wiper arm to be displaced between the operating and raised positions. This is accomplished by manipulating a control switch, such as push button 26, provided inside the vehicle.

In the event the vehicle is parked outdoors overnight and ice and snow are anticipated, the vehicle operator may park the vehicle and then press the push button 26 to raise the wiper assembly 12 to the raised position clear of the windshield W. In this position the windshield wiper assembly 12 and more specifically, the wiper blade 18 will not freeze to the windshield W. Further, when held in the raised position, the assembly 12 is less prone to the accumulation of ice and snow.

The next morning following an ice or snow event, the operator may clear the windshield W with a brush or scraper, enter the vehicle and the press the push button 26 so that the rotary actuator 22 drives the control bar 24 to bring the wiper blades 18 into contact with the windshield W with a force of impact that has been engineered to break any accumulated ice and snow free of the windshield wiper assembly 12 without harming the windshield wiper assembly or the windshield. Once free of ice and snow the windshield wiper assembly 12 may more efficiently and effectively perform its designated duty to sweep the windshield W and keep it clear of any ice and snow that may continue to fall or any slush or other water sprayed upon the windshield during vehicle operation.

Figure 3:
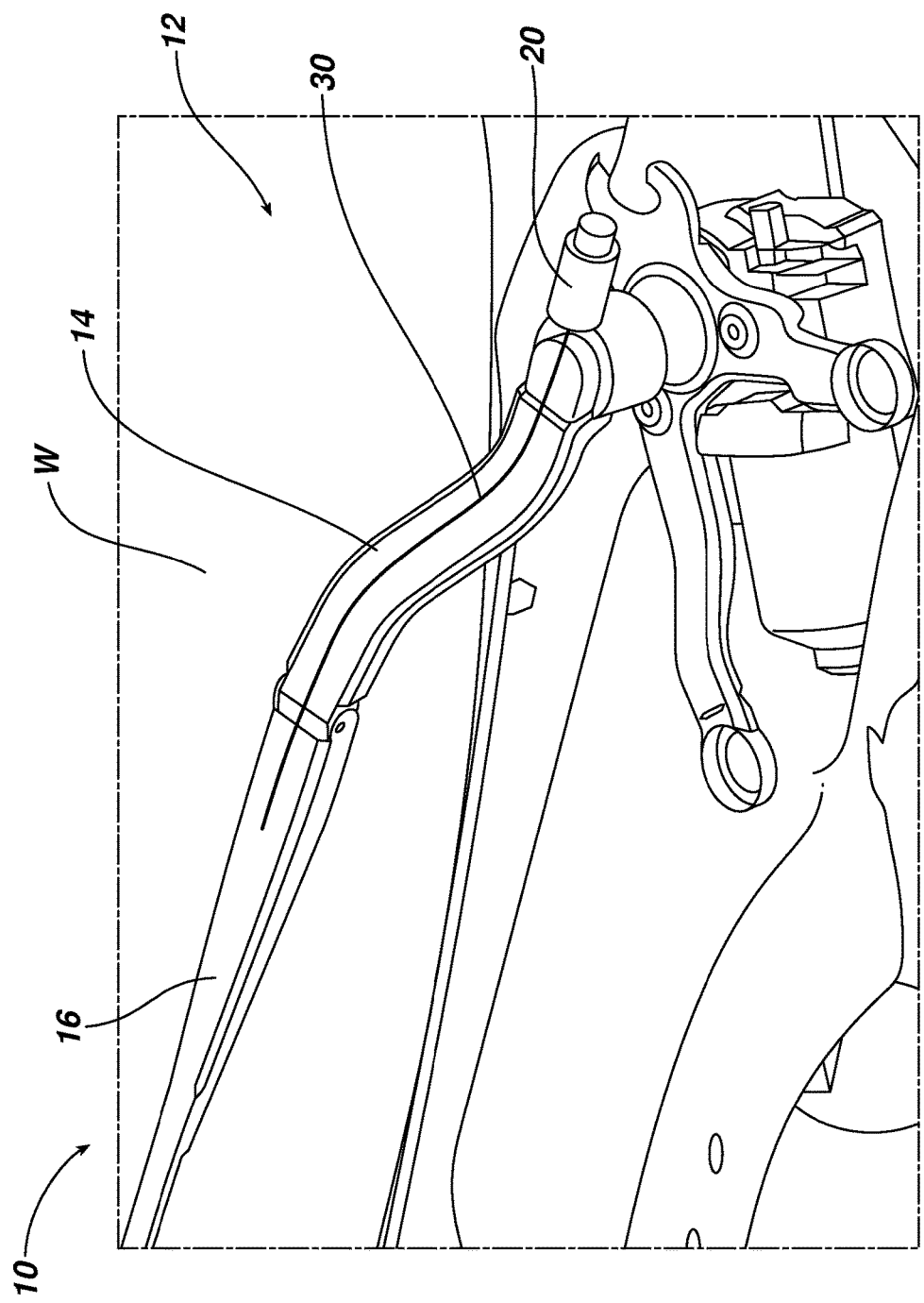
FIG. 3 is a detailed perspective view of an alternative embodiment of wiper assembly.
Figure 4:
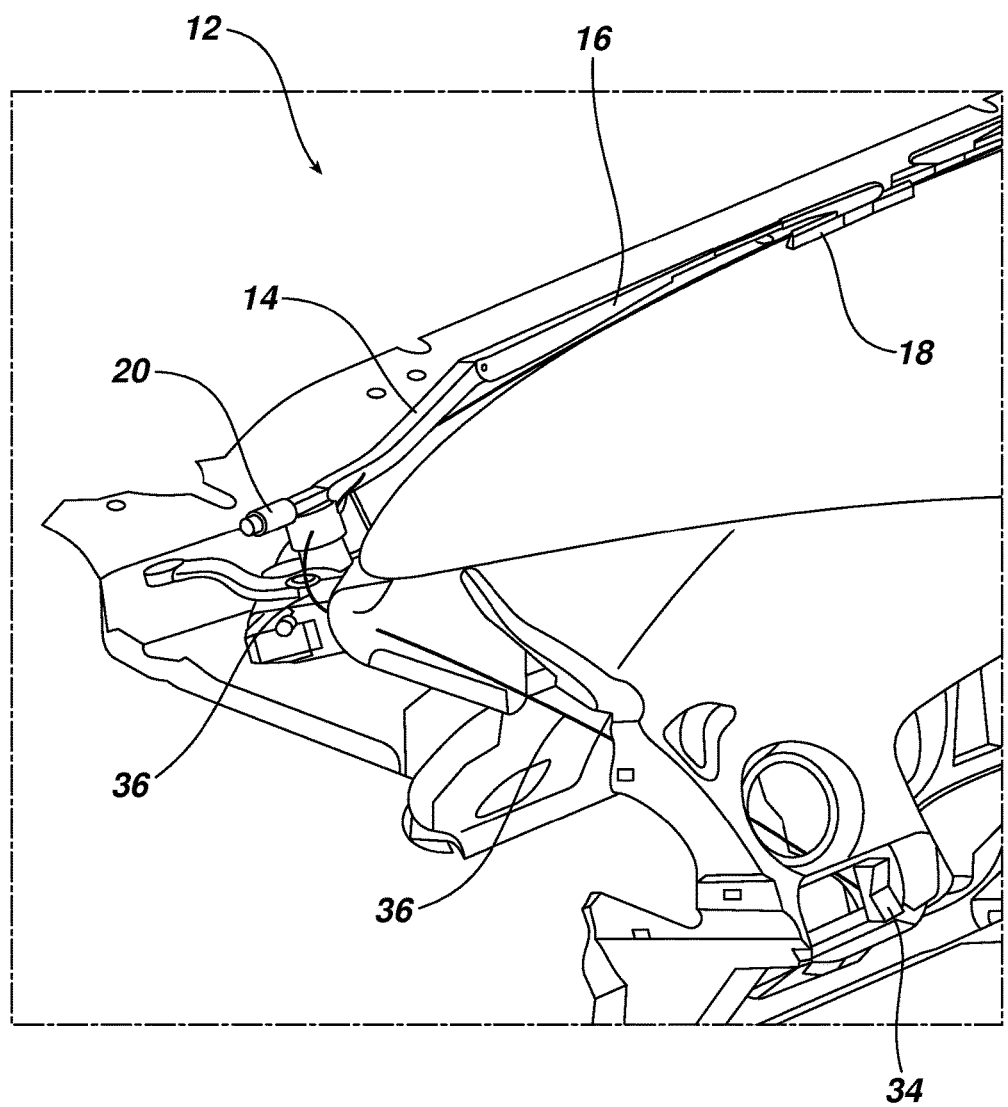
FIG. 4 is a perspective view illustrating a wiper assembly, a control switch on the vehicle interior and electrical wiring connecting the two.
Figure 5:
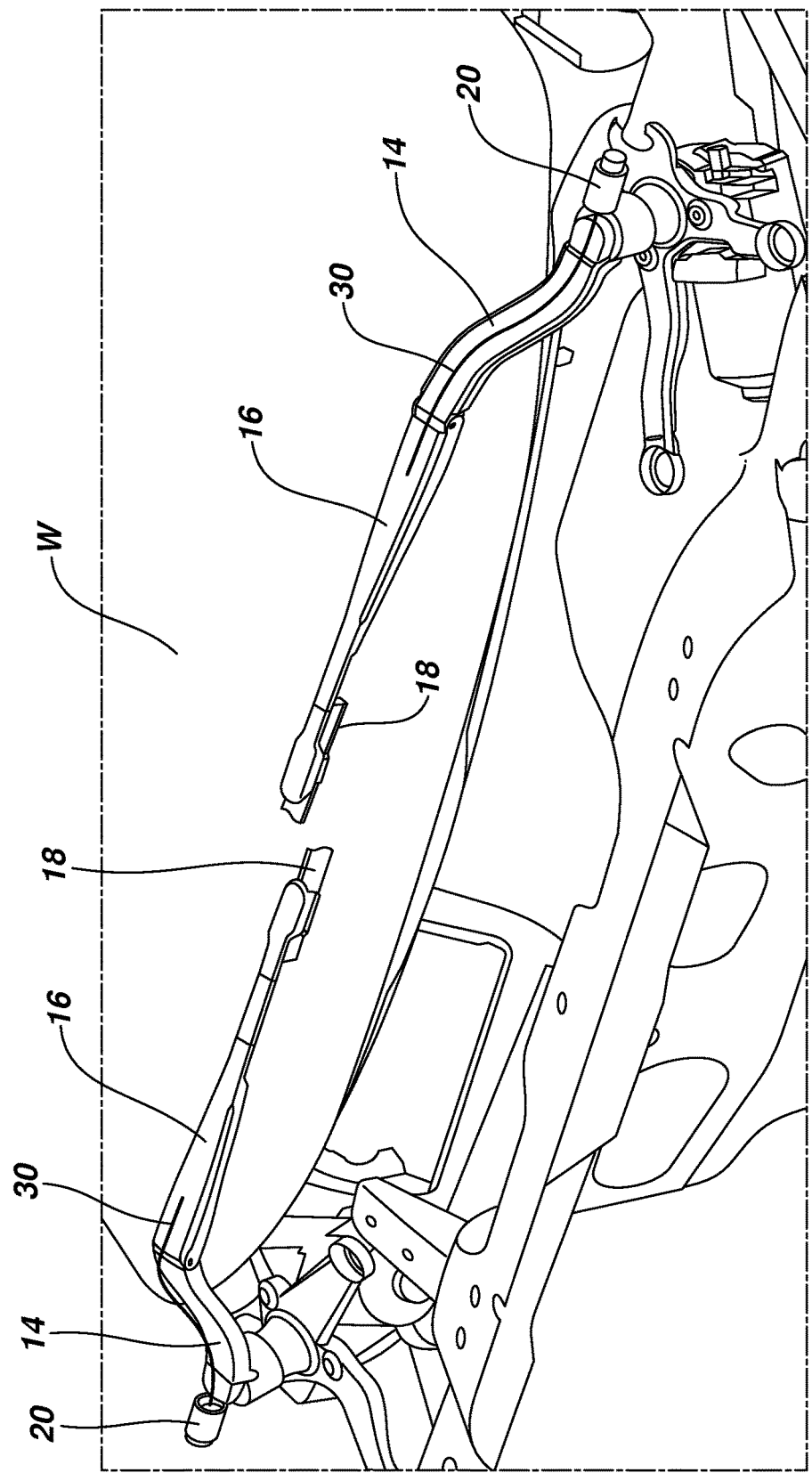
FIG. 5 is a perspective view illustrating a wiper system incorporating two individual wiper assemblies.

An alternative embodiment is illustrated in FIGS. 3, 4 and 5. In this embodiment, the actuator 20 is connected to a cable 30 and leaf spring 32 instead of a control bar 24. More specifically, the actuator 20 is carried on the wiper base 14 and may comprise a rotary actuator with a cooperating reel or a solenoid which is connected to a control switch 34 at the interior of the vehicle by electrical wiring 36 (see FIG. 4).

Figure 6:
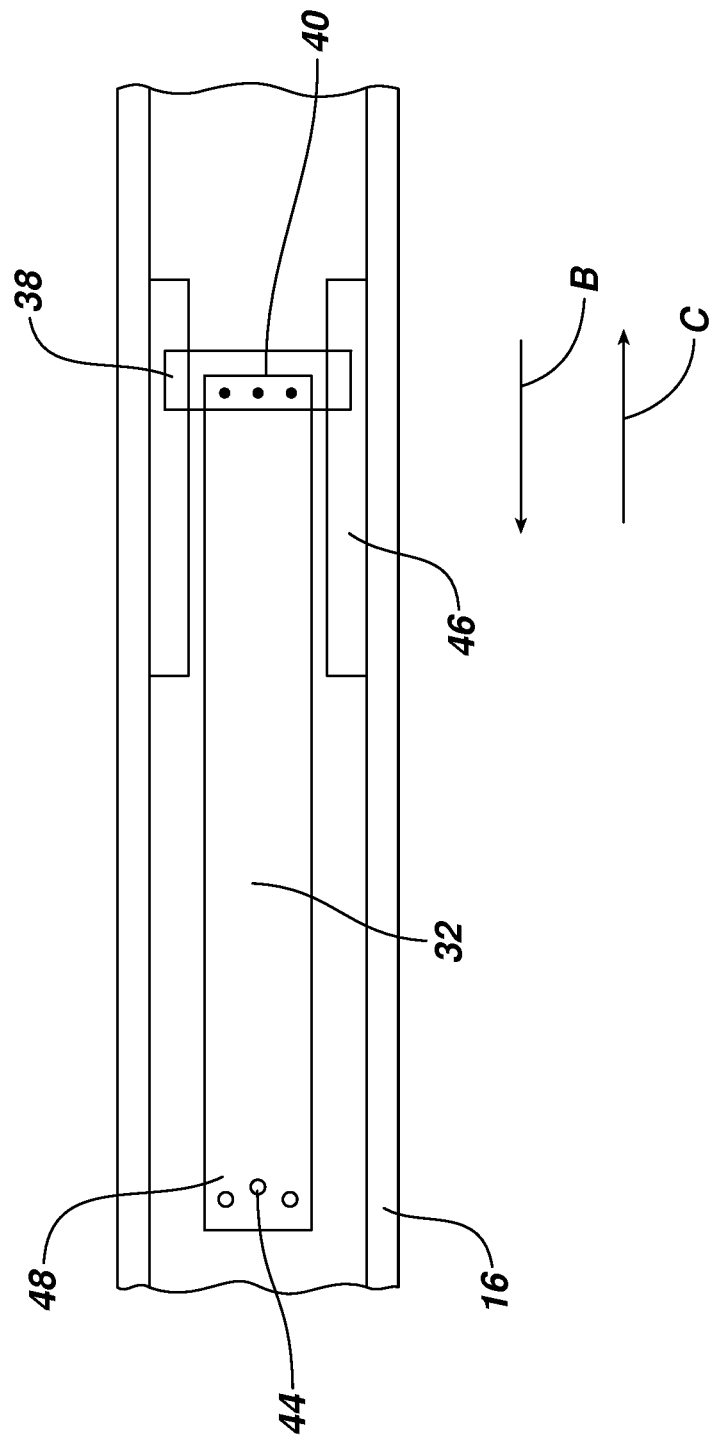
FIG. 6 is a detailed bottom plan view illustrating the track on the wiper arm that receives and guides the support block at the end of the leaf spring.

The cable 30 extends from the actuator 20 through a guide channel or lumen provided on the wiper base 14 and wiper arm 16 to a connection point on a support block 38 secured at one end 40 of the leaf spring 32. The support block 38 freely slides along a track 46 carried on the wiper arm 16 (see FIG. 6). The opposite end 48 of the leaf spring 32 is mounted to the wiper arm 16 by brads, rivets or other fasteners 44.

Figure 7A:
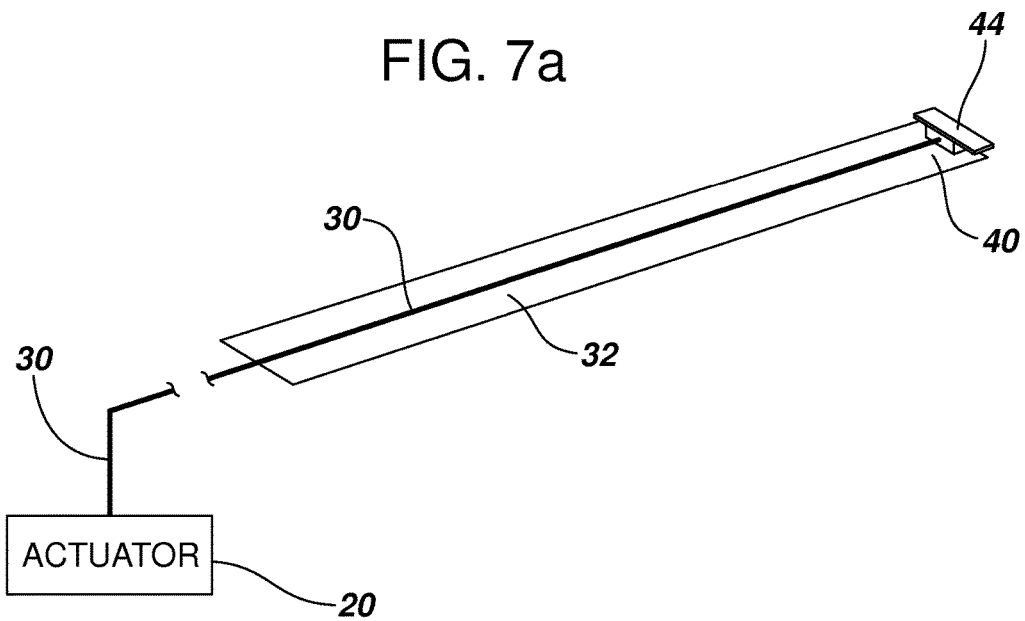
FIGS. 7a and 7b are detailed views of the leaf spring when, respectively, in the lowered operating position and the raised position.
Figure 7B:
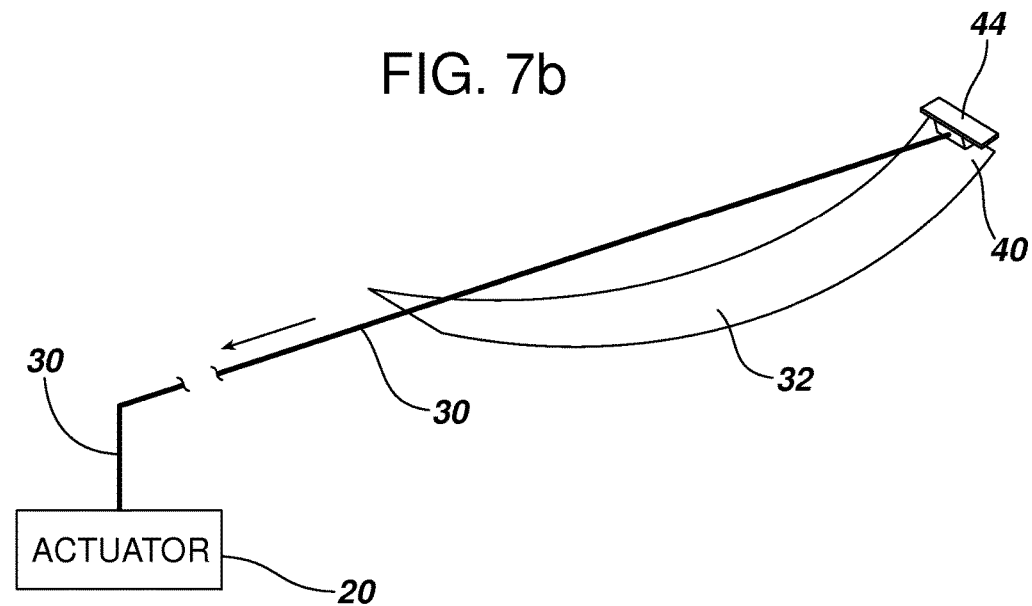

When the wiper system 10 is activated by manipulating the switch 34, the actuator 20 draws the cable 30 toward the wiper base 14 and the support block 38 in the direction of action arrow B along the track 46. This causes (a) the leaf spring 32 to load (note bowing of leaf spring in FIG. 7b) and (b) the wiper arm 16 to pivot on the wiper base 14 thereby moving the wiper blade 18 from the operating position on the window to the raised position.

The wiper blades 18 may be maintained in the raised position for as long as desired, such as when the vehicle is parked outside overnight in winter weather conditions. Upon returning to the vehicle in the morning, the operator may manipulate the switch 34 again to release the wiper blades 18 from the raised position. More specifically, the actuator 20 then releases tension on the cable 30 freeing the stored energy in the leaf spring 32 to power the wiper blades 18 toward the vehicle window W so that an impact of sufficient force is produced to remove accumulated ice and snow but not harm the wiper assembly 12 or the windshield W. When this occurs, the block 38 slides in the direction of action arrow C on the track 46 and the leaf spring 32 straightens (see FIG. 7a).

Figure 8A:
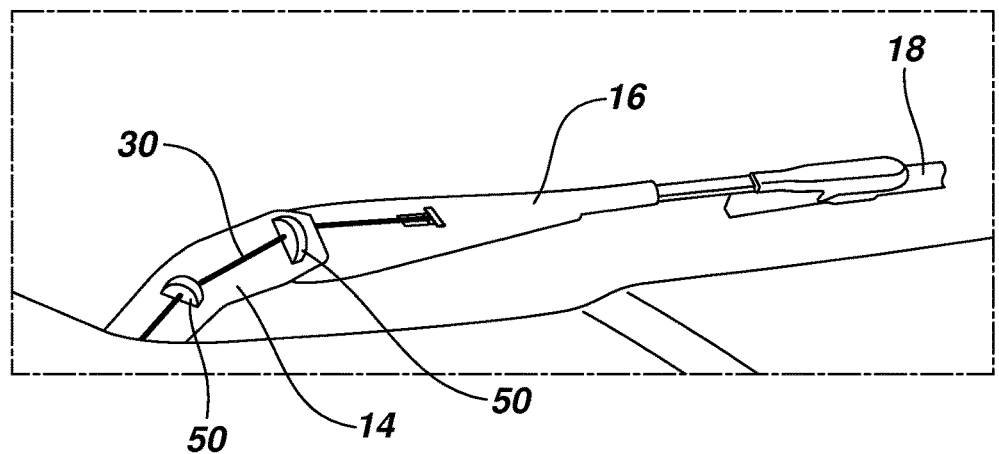
FIG. 8a illustrates yet another embodiment of window wiper system including an actuator incorporating a cable and cooperating leaf spring wherein the wiper assembly is shown in the normal operating position on the windshield.
Figure 8B:
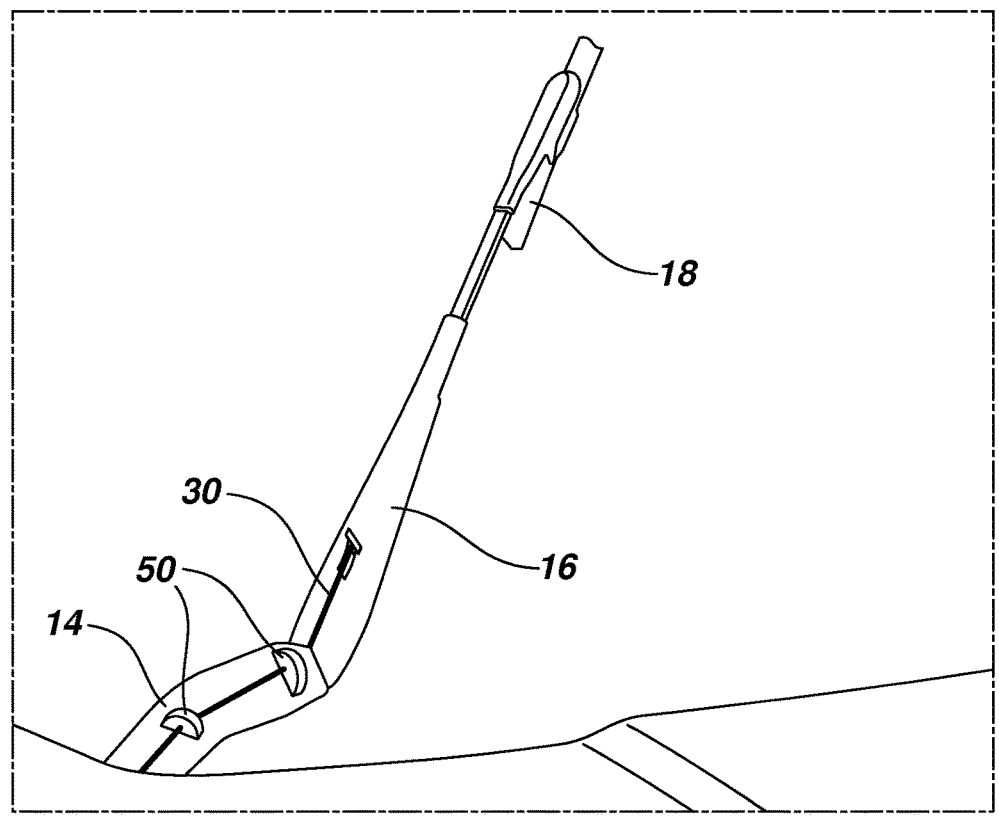
FIG. 8b is a view similar to FIG. 8a but showing the wiper assembly in the raised position.

Yet another embodiment of the wiper system 10 is illustrated in FIGS. 8a and 8b. In this embodiment, the cable 30 passes through and is supported/guided by a series of cable supports 50 provided on the wiper base 14 and wiper arm 16.

The foregoing has been presented for purposes of illustration and description. It is not intended to be exhaustive or to limit the embodiments to the precise form disclosed. Obvious modifications and variations are possible in light of the above teachings. For example, while the actuators 20 in the embodiments illustrated in FIGS. 2 and 3 are mounted to the wiper base 14, it should be appreciated that such a mounting position is not required. In fact, the actuators 20 could be mounted anywhere proximate to the wiper base such as on the wiper support housing. All such modifications and variations are within the scope of the appended claims when interpreted in accordance with the breadth to which they are fairly, legally and equitably entitled.

What is claimed:

1. A window wiper system for providing enhanced performance in winter weather conditions, comprising:
   a wiper assembly including a wiper base, a wiper arm pivotally connected to said wiper base and a wiper blade carried on said wiper arm, said wiper arm being selectively displaceable between an operating position wherein said wiper blade engages and sweeps a vehicle window and a raised position wherein said wiper blade is lifted from said vehicle window;
   an actuator carried on said wiper assembly, said actuator displacing and holding said wiper arm in said raised position, wherein (a) said actuator includes a cable and a leaf spring, (b) said cable extending from said actuator to said leaf spring carried on said wiper arm, (c) said leaf spring has a first end connected to said cable and a second end fixed to said wiper arm, wherein said leaf spring provides a force for biasing said wiper arm toward said operating position and (d) said cable is connected to the first end of said leaf spring through a support block and said support block is received in a guide track carried on said upper arm; and
   a control switch inside said vehicle for activating said actuator.

2. The system of claim 1 wherein retracting said cable displaces said wiper arm into said raised position, lifting said wiper blade from said vehicle window and simultaneously loading said leaf spring and increasing said biasing force with which said wiper blade subsequently engages said vehicle window thereby producing an impact to remove accumulated ice and snow from said wiper assembly.

3. The system of claim 2, further including a series of cable supports on said wiper base and said wiper arm for guiding said cable across said wiper assembly to a connection point with said leaf spring.

4. The system of claim 3, wherein said actuator is secured to said wiper base.

5. The system of claim 4, wherein said actuator is a rotary actuator.

6. The system of claim 4, wherein said actuator is a solenoid.

* * * * *